United States Patent [19]

Ludwig

[11] Patent Number: 5,526,505
[45] Date of Patent: Jun. 11, 1996

[54] FAST LOOKAHEAD CIRCUIT TO IDENTIFY AN ITEM IN A LARGE BINARY SET

[75] Inventor: Mark A. Ludwig, Loveland, Colo.

[73] Assignee: Hewlett-Packard Co., Palo Alto, Calif.

[21] Appl. No.: 493,597

[22] Filed: Jun. 22, 1995

Related U.S. Application Data

[63] Continuation of Ser. No. 888,673, May 27, 1992, abandoned.

[51] Int. Cl.⁶ ............................................. G06F 12/12
[52] U.S. Cl. .................... 395/417; 395/460; 395/464
[58] Field of Search ............................ 395/416, 417, 395/460, 461, 462, 463, 464, 403, 421.03

[56] References Cited

U.S. PATENT DOCUMENTS

| | | | |
|---|---|---|---|
| 4,802,086 | 1/1989 | Gay et al. | 395/425 |
| 5,329,627 | 7/1994 | Nanda et al. | 395/400 |

OTHER PUBLICATIONS

Ward et al., Computation Structures, 1990, pp. 480–490.
E. DeLano, W. Walker, J. Yetter and M. Forsyth, "A High Speed Superscalar PA–RISC Processor", presented at the proceedings of the Compcon Spring 1992, Digest of Papers, Feb. 24, 1992.

Primary Examiner—Jack A. Lane

[57] ABSTRACT

Disclosed is a circuit which selects one of the elements of a translation lookaside buffer for replacement while excluding all other elements that are eligible for replacement. The circuit divides the entries into major groups and further sub-divides each major group into minor groups of elements. Each element within each minor group examines the previous major group, the previous minor group, and the previous entry within the minor group to determine whether an element has already been selected. The circuit will select an entry only if no previous entry within the minor group has been selected, no previous minor group has been selected, and no previous major group has been selected.

7 Claims, 6 Drawing Sheets ive small number of entries, it fills up quickly. Placing an entry into the translation lookaside buffer, therefore, generally requires replacing another entry from the translation lookaside buffer. To maximize performance, entries which
FAST LOOKAHEAD CIRCUIT TO IDENTIFY AN ITEM IN A LARGE BINARY SET

CROSS REFERENCE TO RELATED APPLICATIONS

This is a continuation of application Ser. No. 07/888,673 filed on May 27, 1992, now abandoned.

This application is related to application Ser. No. 07/726,619 filed Jul. 8, 1991 of Jeffry E. Trull, entitled "Cache memory replacement selector", owned by the same entity.

FIELD OF THE INVENTION

This invention relates to computer systems and more particularly to virtual memory or cache memory within such computer systems. Even more particularly, the invention relates to a method and apparatus for determining which slot of a virtual memory or cache memory translation lookaside buffer to replace with new data.

BACKGROUND OF THE INVENTION

Computers often use virtual memory and cache memory to improve performance. A cache memory (called a cache) is a high speed memory which stores frequently used data. Cache memories frequently reside on processor chips between the processor and the RAM contained within a computer system. Cache memories are also used in peripheral device controllers, such as a disk controller. A virtual memory system performs a very similar function between the RAM in a computer and slower storage such as a disk storage drive.

In either of these systems, when a unit of data is requested, the system determines whether the unit of data is contained in the high speed area, such as the cache, or within the slower speed area, such as the RAM. If the data is contained within the high speed area, the processor retrieves it directly from the high speed area and thereby avoids retrieving it from the slower area.

Data is retrieved in the following manner. Data is requested with a key. A translation lookaside buffer, contained within the processor, is then searched for an entry that matches the key. If such an entry is found, the translation lookaside buffer returns the actual location of the data in the high speed area. The processor then retrieves the entry directly from the high speed area using this location.

In a virtual memory system, the high speed area is RAM, and the data is retrieved in units called pages. Therefore, the key is a virtual page number (VPN), and the data is contained in a RAM memory page having a real page number (RPN). The translation lookaside buffer contains entries having a VPN and a corresponding RPN. When the translation lookaside buffer is searched, using a VPN, and a match is found, the buffer returns the corresponding RPN from the matching entry. The RPN is then used to access the data within RAM. If a matching entry is not found in the translation lookaside buffer, the data is retrieved from the disk, placed in RAM at some real page location, and an entry containing the RPN of the real page location, along with the corresponding VPN, is then placed into one of the entries of the translation lookaside buffer.

Because the translation lookaside buffer contains a relatively small number of entries, it fills up quickly. Placing an entry into the translation lookaside buffer, therefore, generally requires replacing another entry from the translation lookaside buffer. To maximize performance, entries which are not being frequently used should be selected for replacement.

Translation lookaside buffer systems employ various well known approaches for selecting an entry which will be replaced. Often, each entry within the translation lookaside buffer contains electronic logic circuits which decide whether the entry should be replaced when a new entry is to be inserted. Therefore, logic circuitry in each of the entries sends a signal which determines whether that particular entry is eligible for replacement. More often, the signal indicates that the entry is not available for replacement, and the signal is called an exclude signal. Once each entry has produced an exclude signal, additional logic must select, from the entries that are not being excluded, one of the entries for replacement, while at the same time ensuring that only a single entry is selected.

One of the most common methods for selecting one of the entries for replacement is a sequential search through the entries and selection of the first entry which is eligible for replacement. This method can be very slow if the element selected for replacement is one of the last elements within the translation lookaside buffer.

Therefore, there is need in the art for an improved selection method to select an entry within a translation lookaside buffer for replacement. The present invention meets this and other needs.

This application is related to application Ser. No. 07/726,619 filed Jul. 8, 1991 of Jeffry E. Trull, entitled "Cache memory replacement selector", owned by the same entity, which is incorporated herein by reference for all that is disclosed and taught therein.

SUMMARY OF THE INVENTION

It is an aspect of the present invention to provide a fast lookahead circuit for identifying items in a large binary set.

It is another aspect of the invention to provide such a circuit for a translation lookaside buffer within a cache or virtual memory system.

The above and other aspects of the invention are accomplished in a circuit which divides the translation lookaside buffer entries into major groups of entries. Each major group of entries is further sub-divided into minor groups of entries. Each entry within each minor group has a corresponding pick element circuit that looks at the previous major group and also the previous minor group to determine whether an entry has already been selected. If the entry corresponding to the pick element circuit is eligible for selection, that is, it has not excluded itself, and no previous selection has occurred, the pick element circuit selects the entry, and blocks all subsequent entries from selection.

The outputs of the four minor groups within a major group are combined to provide an output of the major group and these outputs are used as the major and minor group signals in the pick element circuit to determine if a previous selection has been made.

By combining the lookahead in the manner of the present invention, the state settling time for a 120 entry translation lookaside buffer has been reduced from seven clock periods to two clock periods. Although the invention is useful for virtual memory systems, and for cache memory systems., it is not so limited. The invention can be used in any system requiring that a single unit of the system be selected, while at the same time excluding all other units from selection.

BRIEF DESCRIPTION OF THE DRAWINGS

The above and other aspects, features, and advantages of the invention will be better understood by reading the following more particular description of the invention, presented in conjunction with the following drawings, wherein.

DESCRIPTION OF THE PREFERRED EMBODIMENT

The following description is of the best presently contemplated mode of carrying out the present invention. This description is not to be taken in a limiting sense but is made merely for the purpose of describing the general principles of the invention. The scope of the invention should be determined by referencing the appended claims.

Figure 1:
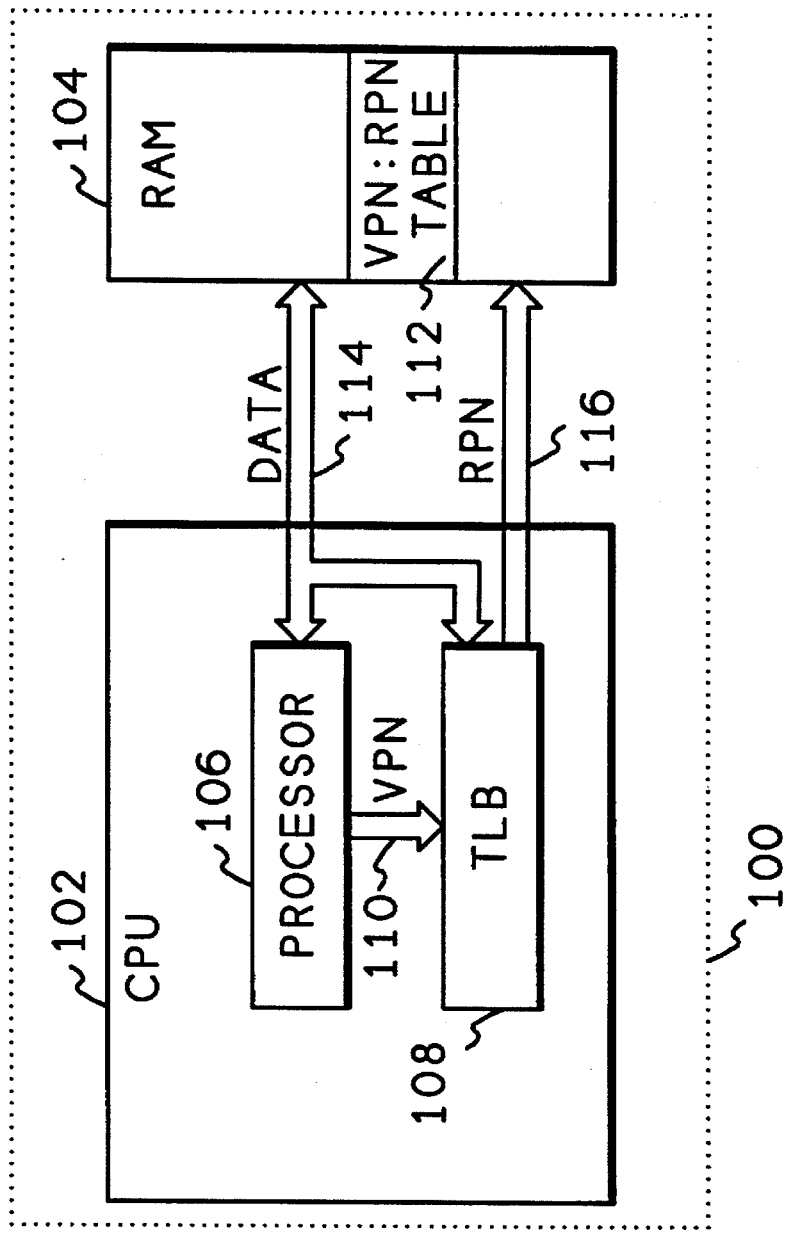
FIG. 1 shows a central processing unit of a computer having a translation lookaside buffer.

FIG. 1 shows a block diagram of a computer system having a translation lookaside buffer of the present invention used in a virtual memory system. Referring now to FIG. 1, a computer system 100 contains a central processing unit 102, which accesses a random access memory (RAM) 104 through a data bus 114. A processor 106, contained within the CPU 102, performs arithmetic and logic instructions within the computer system 100.

Memory within the RAM 104 is divided into blocks called pages. A page is a group of contiguous memory, typically having a binary multiple in size. For example, a page is typically 1024 bytes, 2048 bytes, 4096 bytes, etc. in size. Often, the page size can be selected by software running in the computer system 100.

When the processor 106 desires to access data within the RAM 104, it passes a page address part of the data address to a translation lookaside buffer (TLB) 108 over a VPN bus 110. This address is called the virtual page number (VPN) and it must be translated to a real page number (RPN) which is the address of the page within the RAM 104 where the data is located. In order to perform the translation between a VPN and a RPN, the TLB 108 uses a VPN:RPN table 112 contained within the RAM 104. The VPN:RPN table contains a translation between all possible virtual page numbers and the corresponding real page numbers that contain the data for the virtual page. However, if the real page is not contained within the RAM, that is, it is contained on slower storage device such as a disk, the RPN will indicate the location on the disk rather than the location in the RAM 104. If the access is to a page which is not contained in RAM, the TLB 108 will cause an interrupt which notifies a software routine, typically called a virtual page manager, which retrieves the page from disk and places it in RAM. The system then repeats the instruction in order to access the data in the RAM.

To perform the translation from a virtual page number to a real page number, the TLB accesses the VPN:RPN table 112. After an access to the table 112, the entry containing the virtual page number and corresponding real page number is placed into an entry within the TLB 108. Therefore, the next time data on this page is accessed, the TLB can make the translation immediately without having to retrieve part of the table 112 from the RAM 104. In this manner, translation speed is greatly increased. The TLB 108, however, has a very limited number of entries, typically far smaller than the number of entries contained in the VPN:RPN table 112. Therefore, a method must be used to determine which of the table 112 entries are replaced in the TLB 108 when a new entry is to be inserted.

Many well known methods are used to determine which entry within a TLB is to be replaced. One such method, called least recently used, replaces the TLB entry which has not been used for the longest period of time. In this method, when an entry is used to perform a translation, a bit is marked to indicate that the entry was used recently. Periodically, all the bits will be unmarked. Only unmarked entries, which have not been used since all the bits were last unmarked, will be considered for replacement.

In combination with this method, each entry within the TLB may have a bit, called the match inhibit bit, that inhibits replacing of the entry. This bit is set by the software in the system, when the software determines that a page is heavily used and its entry must always remain in the TLB.

Also, an entry may be marked as valid or not valid. A valid entry would be an entry which contains a VPN:RPN combination, and an invalid entry would be one which has not yet had a VPN:RPN combination placed into it. Typically, an entry might be set invalid when the system is initialized, and would become valid as translation information is placed into it.

Yet another method used to determine which entry is to be replaced, is to have a separate register which contains a pointer to an entry which will be selected for the next replacement. For example, this pointer might be set by software as a diagnostic tool to insure that a particular entry is replaced at a particular time.

Figure 2:
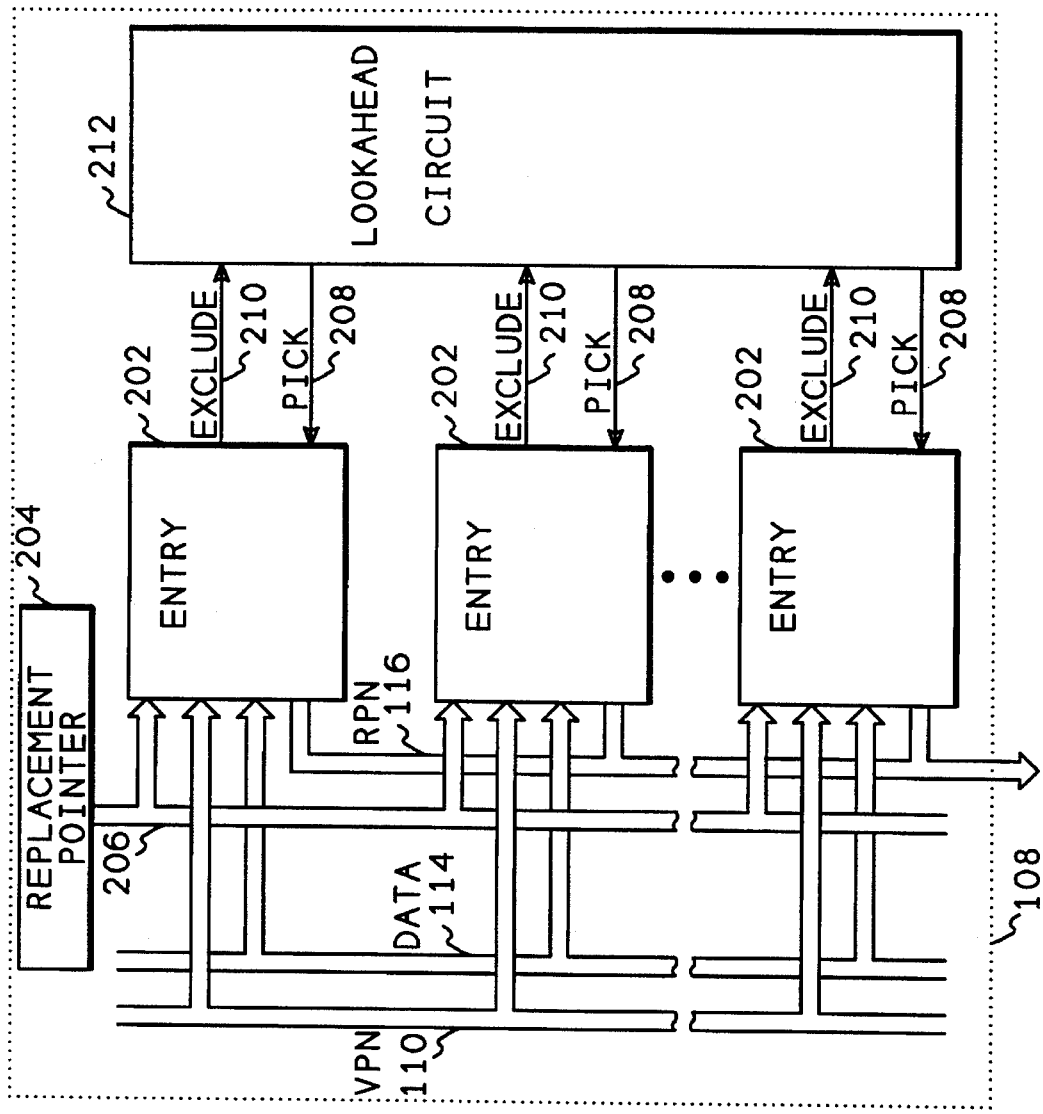
FIG. 2 shows a block diagram of the translation lookaside buffer.

FIG. 2 shows a block diagram of the translation lookaside buffer 108. Referring now to FIG. 2, the translation lookaside buffer 108 contains a plurality of entries 202. For example, a typical TLB might contain 64–128 entries 202. As discussed above, when the processor 106 (FIG. 1) sends a virtual page number over the VPN bus 110, each of the entries 202 examines their contents for a match between the VPN contained in the entry 202 and the VPN from the VPN bus 110. If a match occurs in an entry, the entry sends a real page number over the RPN bus 116, and this RPN is then used to access the RAM 104 (FIG. 1). When one of the entries 202 needs to be updated, the new VPN:RPN data is sent over the data bus 114 to each of the entries 202. Logic circuitry within each entry decides whether an entry is eligible for update, based on the methods described above. If an entry determines that it is not eligible for update, it sends an exclude signal 210 to lookahead circuit 212 which will be described below. If an entry is eligible to be updated, the exclude signal 210 is conditioned to allow the entry to be updated. The lookahead circuit 212, which would be described below with respect to FIGS. 3–6, then determines which of the entries is to be updated, and returns a pick signal 208 to the entry selected for update. Only the entry that receives a pick signal 208 will actually change its contents in the update process.

The present invention comprises the lookahead circuit 212 for determining which of the entries 202 within the TLB is selected for an update. This circuit has one pick element circuit for each of the entries 202. A pick element circuit determines whether the corresponding entry 202 is selected for update. The circuit divides the elements into major groups comprising 32 elements each. It further divides each major group into minor groups comprising eight elements each. Each element within each minor group examines the previous major group and also the previous minor group to determine whether an entry has already been selected by a previous element. The outputs of the four minor groups within a major group are combined with the output of the previous major group to provide an output of the major group, which is connected as an input to the next major group.

Figure 3:
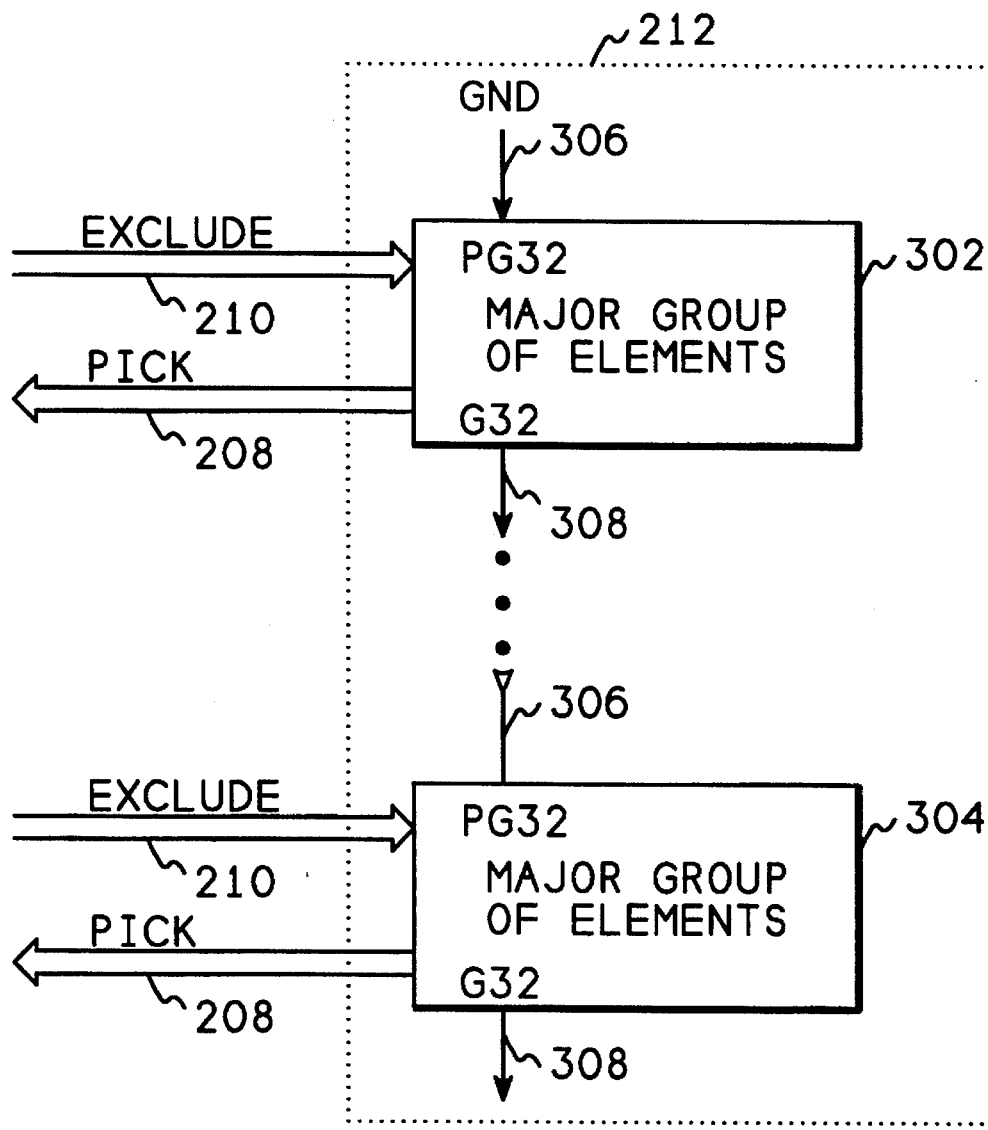
FIG. 3 shows the connections between the major groups of translation lookaside buffer pick element circuits.

FIGS. 3–6 show block diagrams and circuitry for the lookahead circuit 212 that selects a TLB entry for update. FIG. 3 is a block diagram showing how the major groups are interconnected. Referring now to FIG. 3, two major groups, 302 and 304, are shown. However, the invention works with any number of major groups, thus, the invention can work with any size translation lookaside buffer having any number of entries.

Each major group has a previous group entry PG32 306 which indicates whether one of the entries in a previous major group has been selected. For the first major group of elements, indicated by major group 302, the PG32 input 306 is grounded to indicate that there is no previous major group to be selected prior to the first major group. Each major group of elements has an output G32 308 which indicates whether one of the elements within the major group, or a previous major group, has been selected. For all major groups after the first major group, the output G32 308 is connected to the input 306 of the subsequent major group of elements. Thus, the selection signal is propagated serially from one major group to another.

Exclude signals 210 are sent by the entries 202 (shown in FIG. 2) and Pick signals 208 are returned to the entries 202 (shown in FIG. 2).

Figure 4:
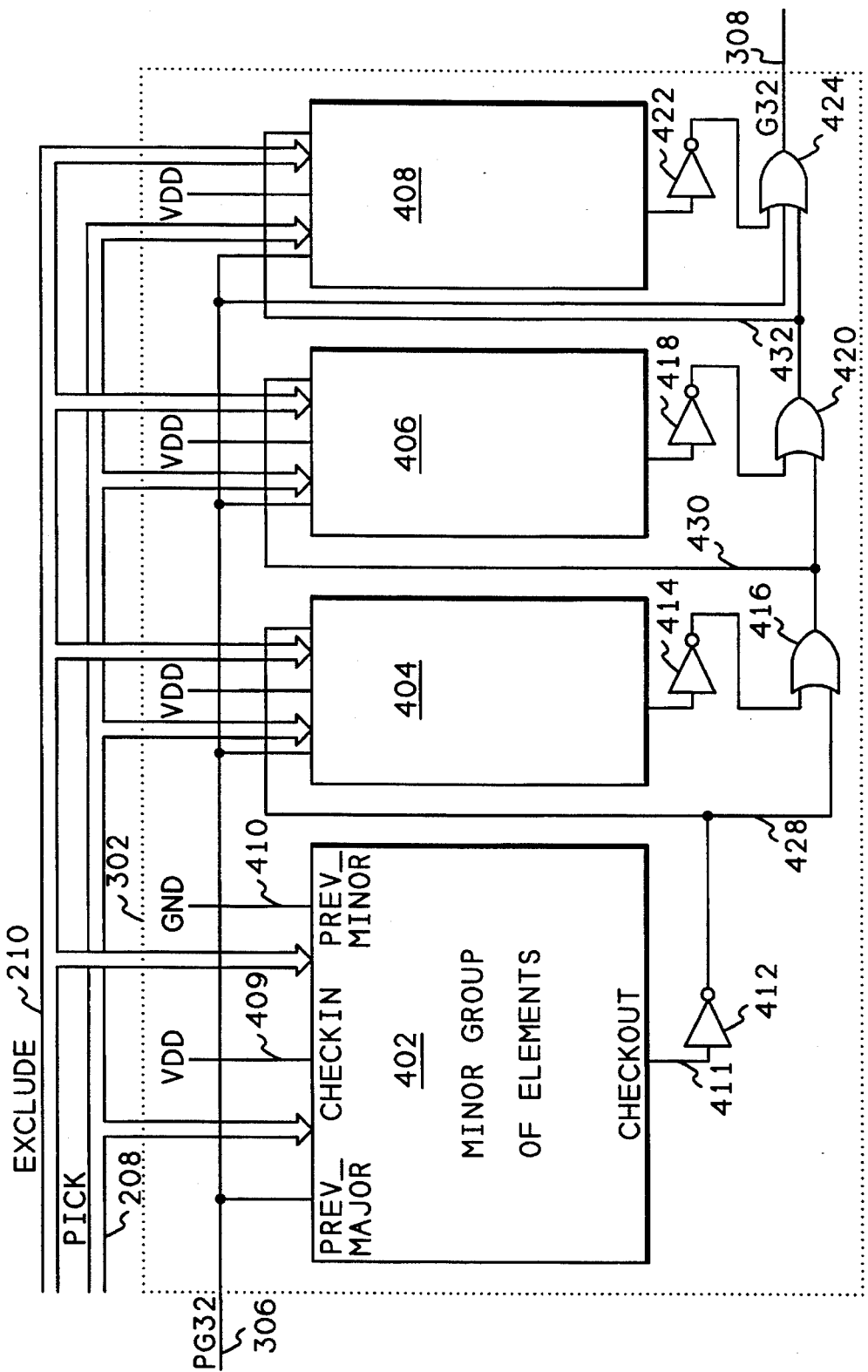
FIG. 4 shows the connections between the minor groups of pick element circuits.

FIG. 4 shows a block diagram of a major group of elements, such as major group 302 of FIG. 3. Referring now to FIG. 4, a major group 302 is shown having four identical minor groups 402, 404, 406, 408. Although four minor groups are shown in the preferred embodiment, any number of minor groups can be included in a major group. Each of the minor groups 402,404,406, and 408 has the PG32 signal 306 as an input. Each of the minor groups 402, 404,406, 408 also has an input from the previous minor group. The PREV_MINOR input to the first minor group of elements 402, signal 410, is grounded to indicate that there is no previous minor group to be selected. The output of the first minor group of elements is connected to an inverter 412 whose output is sent to the PREV_MINOR input of the second minor group 404 within the major group 302. The output of the second minor group 404 is connected to an inverter 414 whose output is connected to an input of an OR circuit 416. The other input to the OR circuit 416 is the output of the inverter 412 from the first minor group 402. Thus, the output of the OR circuit 416 indicates whether an element has been selected from either the first or the second minor group.

The output of the OR circuit. 416 is connected to the PREV_MINOR input of the third minor group 406. The output of the third minor group is connected to an inverter 418 whose output is connected to a second OR circuit 420. The other input to the OR circuit 420 is the output from the OR circuit 416 of the second minor group 404. Thus, the output of the OR circuit 420 indicates whether an element from the first, second, or third minor groups has been selected.

The output of the OR circuit 420 is connected to the PREV_MINOR input to the fourth minor group 408. The output of the fourth minor group is connected to an inverter circuit 422 whose output is connected to a three input OR circuit 424. The second input to the OR circuit 424 is the output of the OR circuit 420 and the third input to the OR circuit 424 is the PG32 signal 306. Thus, the output of the OR circuit 424 indicates whether any of the elements within any of the four minor groups 402,404,406, or 408 has been selected, or whether an element in any previous major group has been selected. The output of the OR circuit 424 is the G32 signal 308 also shown in FIG. 3. Exclude signals 210 are sent by the entries 202 (shown in FIG. 2) and Pick signals 208 are returned to the entries 202 (shown in FIG. 2).

Figure 5:
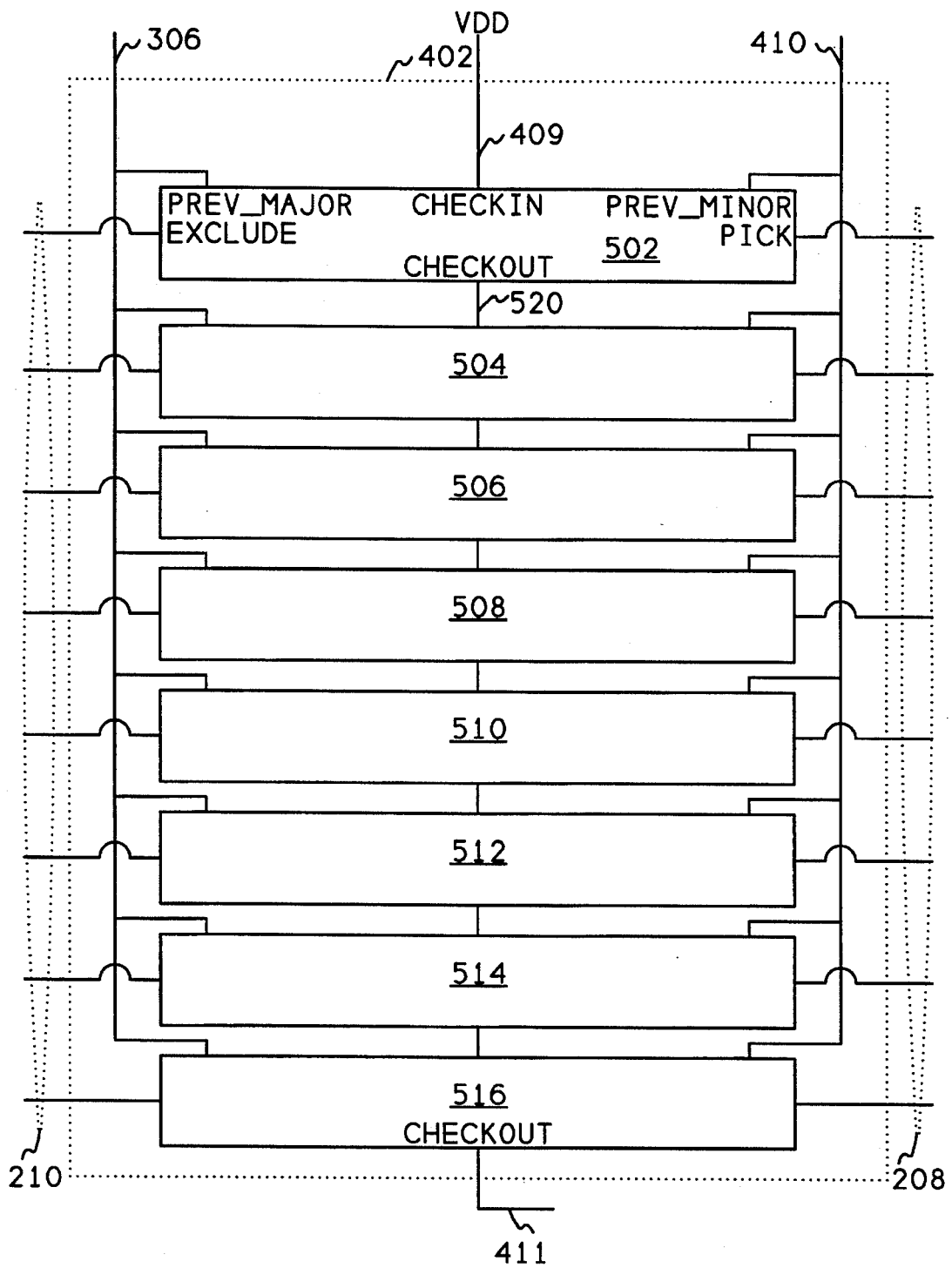
FIG. 5 shows the connections within a minor group of pick element circuits.

FIG. 5 shows a block diagram of the minor group 402 from FIG. 4. Referring now to FIG. 5, the minor group 402 is shown having eight identical elements 502, 504, 506, 508, 510, 512, 514, and 516. Although eight elements are shown in the preferred embodiment, any number of elements can be included in a minor group. The PG32 signal 306 is shown connected to each of the elements as the PREV_MAJOR input. The PREV_MINOR input 410 to each of the elements is the signal shown in FIG. 4.

Each of the elements also has a CHECKIN signal which indicates whether a previous element within the minor group has been selected. For the first element within the minor group, the CHECKIN signal 409 is connected to VDD to indicate that there is no previous element to make a selection prior to the first element. Each element also has a CHECK-OUT signal which indicates whether this element, or a previous element in the minor group, has been selected. The CHECKOUT signal of one element is connected to the CHECKIN signal of the following element. The CHECK-OUT signal of the last element 516 becomes the output of the minor group 402. Thus, for example, the CHECKOUT signal for element 516 is the CHECKOUT signal 411 of FIG. 4. Each element also has an EXCLUDE signal 210 which comes from the TLB entry 202 shown in FIG. 2. Each individual entry 202 (FIG. 2) has an EXCLUDE signal which is unique to that entry and this exclude signal is connected to a unique element within one of the minor group of elements of one of the major group of elements. Thus, there is a one to one correspondence between a pick element circuit and a TLB entry. The EXCLUDE signal 210 is used by the entry 202 to indicate to the corresponding element that the entry is excluding itself from selection.

Each element also has a pick signal 208 which is connected back to the same entry from which the EXCLUDE signal 210 was received. If the element determines that the entry is to be selected, the element sets the pick signal 208 to indicate to the entry that entry has been selected.

Figure 6:
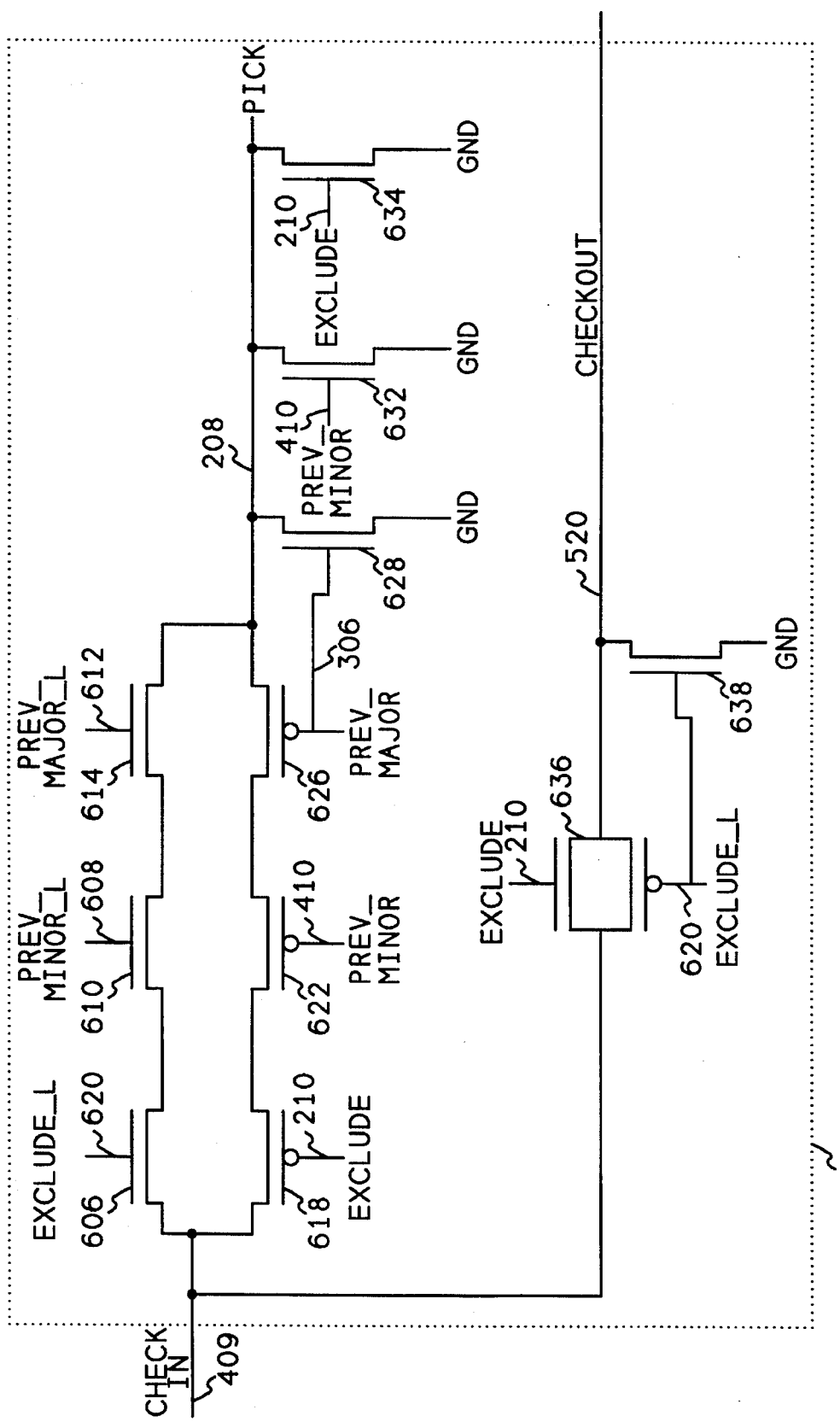
FIG. 6 shows the pick element circuit of a translation lookaside buffer, implemented in CMOS logic.

FIG. 6 shows a circuit diagram of a translation lookaside buffer pick element circuit, such as one of the elements 502, 504, etc. The circuit of FIG. 6 is implemented using CMOS logic. As described above with respect to FIGS. 2 and 5, the purpose of a pick element circuit is to determine whether an entry 202 (FIG. 2) should be selected. Before an entry can be selected, however, a previous entry must not have been selected, and the entry must not have excluded itself using the EXCLUDE signal 210. In complementary metal oxide semiconductor logic (CMOS) signals exist in complimentary pairs called the low signal and the high signal. Although the logic described above with respect to FIGS. 1–5 has been described in a logic independent manner, it is well understood in the art how to create complementary signals and to use these complementary signals within CMOS logic. Therefore, although the input signals to the element shown in FIG. 6 are shown above with respect to FIGS. 1–5 as single signals, they will be described in FIG. 6 as complementary signals. For example, the EXCLUDE signal 210 shown in FIG. 2 as a single signal, however, it is shown and described in FIG. 6 as EXCLUDE signal 210 and the complementary signal EXCLUDE_L 620.

Referring now to FIG. 6, CHECKIN signal 409 is connected to the source inputs of two CMOS transistors 606 and 618. The gate inputs of these two transistors are connected to the EXCLUDE signal 210 and its complement, EXCLUDE_L signal 620. Thus, if the EXCLUDE signal 210 is at ground level to indicate that the entry 202 (FIG. 2) is not to be excluded, CMOS transistors 606 and 618 will conduct to pass the CHECKIN signal through to CMOS transistors 610 and 622. These transistors have the PREV$_{13}$ MINOR signal 410 and its complement PREV_MINOR_L 608 connected in the same manner as the EXCLUDE signal is connected to transistors 606 and 618. Therefore, a ground on PREV_MINOR signal will cause transistors 610 and 622 to conduct to allow the CHECKIN signal to pass through the transistors 610 and 622 indicating that a previous entry has not been selected. The source inputs of CMOS transistors 614 and 626 are connected to the drain outputs of the transistors 610 and 622. The PREV_MAJOR signal 306 and its complement PREV_MAJOR_L 612 are connected to the gate inputs of these two transistors in the same manner as the PREV_MINOR signal is connected to transistors 610 and 622. Thus, a ground on the PREV_MAJOR signal will cause transistors 614 and 626 to conduct to allow the CHECKIN signal to pass through transistors 614 and 626 to create the PICK signal 208. CMOS transistors 628, 632, and 634 have the PREV_MAJOR, PREV_MINOR, and EXCLUDE signals connected to their gates respectively. Thus, if either a previous major group has been selected, or a previous minor group has been selected, or the entry excludes itself, one of the transistors 628, 632, or 634 will conduct, grounding the PICK signal, indicating that the entry is not selected. If none of this occurs, the CHECKIN signal will pass through the circuit causing the PICK signal to indicate that the entry is to be selected, if no previous entry in this minor group has already been selected.

The CHECKIN signal 409 is also connected to a transfer gate 636. The EXCLUDE signal 210 and its complement, EXCLUDE_L 620, are connected to the gate inputs of the transfer gate 636. Therefore, if an entry has excluded itself, transfer gate 636 will pass the CHECKIN signal through to the CHECKOUT signal 520. If an entry has not excluded itself, however, transfer gate 636 will block the CHECKIN signal, and CMOS transistor 638 will ground the CHECKOUT signal, indicating that no succeeding entry should be picked. Whether the entry will actually be picked, is dependent upon the settings of the PREV_MINOR and PREV_MAJOR signals as described above.

In the manner described above, any of the entries 202 that does not exclude itself, will cause the corresponding pick element circuit to block the check-in signal. The first entry that has not excluded itself will also cause its pick element circuit to set its PICK signal, thus selecting the entry. Any entry that has excluded itself will cause the corresponding pick element circuit to pass the CHECKIN signal to CHECKOUT through only a single transfer gate. Once an entry is selected, its CHECKOUT signal will be grounded, and this signal will quickly propagate through the other elements of the minor group. Once the output of a minor group indicates a selection, all other minor groups, if any, in the major group detect the selection immediately, and the output of the major group then indicates that a selection has occurred. Once a major group indicates that a selection has occurred, the three input OR circuit in each subsequent major group quickly indicates that a selection has occurred. In this manner, the circuit significantly improves the speed of selection.

Having thus described a presently preferred embodiment of the present invention, it will now be appreciated that the aspects of the invention have been fully achieved, and it will be understood by those skilled in the art that many changes in construction and circuitry and widely differing embodiments and applications of the invention will suggest themselves without departing from the spirit and scope of the present invention. The disclosures and the description herein are intended to be illustrative and are not in any sense limiting of the invention, more preferably defined in scope by the following claims.

What is claimed is:

1. In a translation lookaside buffer circuit of a virtual memory system, a lookahead circuit for sending a pick signal selecting one of a plurality of entries in the translation lookaside buffer circuit, said lookahead circuit comprising:

a plurality of pick element circuit groups connected in series, each of said pick element circuit groups connected to receive a group signal from a previous group in said series, wherein said group signal output by each one of said plurality of pick element circuit groups indicates whether a selection of an entry occurred within said one of said plurality of pick element circuit groups or any previous pick element circuit group in said series, and wherein each one of said plurality of pick element circuit groups comprises a plurality of pick element circuits, one of said pick element circuits corresponding to each one of said plurality of entries in the translation lookaside buffer circuit, wherein each pick element circuit is responsive to an exclude signal from said entry in the translation lookaside buffer circuit, and wherein each of said pick element circuits receives, in parallel, said group signal from said previous pick element circuit group, and wherein each pick element circuit sends said pick signal selecting said corresponding entry in the translation lookaside buffer circuit when said exclude signal indicates that said corresponding entry in the translation lookaside buffer circuit is eligible for selection and said group signal indicates that no selection occurred in a previous pick element circuit group, and further wherein output signals of said pick element circuits are connected to provide said group signal for output by said one of said plurality of pick element circuit groups when said group signal indicates that no selection occurred in a previous pick element circuit group and no pick element circuit within said one of said plurality of pick element circuit groups sent a pick signal.

2. The translation lookaside buffer circuit of claim 3 wherein each one of said plurality of pick element circuit groups further comprises:

a plurality of minor pick element circuit groups, each containing at least two of said pick element circuits, wherein said minor pick element circuit groups are connected to receive, in parallel, said group signal from said previous pick element circuit group, and each minor pick element circuit group is connected to receive a minor group signal from a previous minor pick element circuit group in said series, and further wherein said minor group signal output from each one of said minor pick element circuit groups indicates whether a selection of an entry occurred within said one of said minor pick element circuit groups, or a previous minor pick element circuit group in said one of said plurality of pick element circuit groups, and wherein said minor group signal output from a last one of said minor pick element circuit groups in said one of said plurality of pick element circuit groups provides said group signal for output by said one of said plurality of pick element circuit groups.

3. The translation lookaside buffer circuit of claim 4 wherein each one of said plurality of pick element circuits within each one of said plurality of minor pick element group circuits comprises:

transfer gate means, responsive to said exclude signal from said corresponding entry in the translation lookaside buffer, for connecting a check signal from a previous pick element circuit within said one of said plurality of minor pick element circuit groups to a check signal of a subsequent pick element circuit within said one of said plurality of minor pick element circuit groups when said exclude signal indicates that said corresponding entry in the translation lookaside buffer circuit is not eligible for selection, and for blocking said check signal when said exclude signal indicates that said corresponding entry in the translation lookaside buffer circuit is eligible for selection; and means responsive to said group signal, said minor group signal and said exclude signal, for connecting said check signal to said pick signal if said group signal and said minor group signal indicate that no selection occurred within any previous pick element circuit group, or minor pick element circuit group, and said exclude signal indicates that said corresponding entry in the translation lookaside buffer circuit is eligible for selection.

4. In a translation lookaside buffer circuit of a virtual memory system, a lookahead circuit for sending a pick signal selecting one of a plurality of entries in the translation lookaside buffer circuit, said lookahead circuit comprising:

a plurality of major pick element circuit groups connected in series, each of said major pick element circuit groups connected to receive a group signal from a previous major pick element circuit group in said series, wherein said group signal output by each one of said plurality of major pick element circuit groups indicates whether a selection occurred within said one of said plurality of major pick element circuit groups or any previous major pick element circuit group in said series, and wherein each one of said plurality of major pick element circuit groups comprises a plurality of minor pick element circuit groups connected to receive, in parallel, said group signal from said previous major pick element circuit group, and each minor pick element circuit is connected to receive a minor group signal from a previous minor pick element circuit group in said one of said plurality of major pick element circuit groups, and further wherein said minor group signal output from each one of said minor pick element circuit groups indicates whether a selection occurred within said one of said minor pick element circuit groups, or previous minor pick element circuit group within said one of said plurality of pick element circuit groups, and further wherein said minor group signal output from a last of said minor pick element circuit groups within said one of said major pick element circuit groups indicates whether a selection occurred within any of said minor pick element circuit groups of said one of said major pick element circuit groups, and wherein each one of said minor pick element circuit groups comprises a plurality of pick element circuits connected in series, wherein each one of said pick element circuits comprises transfer gate means, responsive to an exclude signal from an entry in the translation lookaside buffer circuit corresponding to said one of said plurality of pick element circuits for connecting a check signal from a previous pick element circuit within said one of said minor pick element circuit groups to a check signal of a subsequent pick element circuit within said one of said minor pick element circuit groups when said exclude signal indicates that said corresponding entry in the translation lookaside buffer circuit is not eligible for selection, and for blocking said check signal when said exclude signal indicates that said corresponding entry in the translation lookaside buffer circuit is eligible for selection; and means responsive to said minor group signal, said major group signal, and said exclude signal, for connecting said check signal to said pick signal when said major group signal indicates that no selection occurred within any previous major pick element circuit group, said minor group signal indicates that no selection has occurred within any previous minor pick element circuit group within said one of said major pick element circuit groups, and said exclude signal indicates that the corresponding entry in the translation lookaside buffer circuit is eligible for selection.

5. In a circuit having a plurality of entries, each of the entries providing an exclude signal, a lookahead circuit for selecting one of the entries in the circuit, said lookahead circuit comprising:

a plurality of pick element circuit groups connected in series, each of said pick element circuit groups connected to receive a group signal from a previous pick element circuit group in said series, wherein said group signal output by each one of said plurality of pick element circuit groups indicates whether a selection occurred within said one of said plurality of pick element circuit groups or any previous pick element circuit group, and wherein each one of said plurality of pick element circuit groups comprises a plurality of pick element circuits, one of said pick element circuits corresponding to each one of said plurality of entries in the circuit, wherein said pick element circuit receives, in parallel, said group signal from said previous pick element circuit group and further receives said exclude signal from said corresponding entry in the circuit, and wherein said pick element circuit selects said corresponding entry in the circuit when said group signal indicates that no selection has occurred in said previous pick element circuit group and when said exclude signal indicates that the corresponding entry in the circuit is eligible for selection, and further wherein said pick element circuits are connected to provide said group signal for output by said one of said plurality of pick element circuit groups when said group signal indicates that no selection occurred in a previous pick element circuit group and no pick element circuit within said one of said plurality of pick element circuit groups selected a corresponding entry.

6. The circuit of claim 5 wherein each of said groups of pick elements further comprises:

a plurality minor pick element circuit groups, each containing at least two of said pick element circuits, wherein said minor pick element circuit groups are connected to receive, in parallel, said group signal from said previous pick element circuit group, and each minor pick element circuit group is connected to receive a minor group signal from a previous minor pick element circuit group, and further wherein said minor group signal output from each one of said minor pick element circuit groups indicates whether a selection of an entry occurred within said one of said minor pick element circuit groups, or a previous minor pick element circuit group within said one of said plurality of pick element circuit groups, and wherein said minor group signal output from a last one of said minor pick element circuit groups within said one of said plurality of pick element circuit groups provides said group signal for output by said one of said plurality of pick element circuit groups.

7. The circuit of claim 6 wherein each one of said plurality of pick element circuits within each one of said plurality of minor pick element group circuits comprises:

transfer gate means, responsive to said exclude signal from said corresponding entry in the circuit, for connecting a check signal from a previous pick element circuit within said one of said plurality of minor pick element circuit groups to a check signal of a subsequent pick element circuit within said one of said plurality of minor pick element circuit groups when said exclude signal indicates that said corresponding entry in the circuit is not eligible for selection, and for blocking said check signal when said selection eligible signal indicates that said corresponding entry in the circuit is eligible for selection; and means responsive to said group signal, said minor group signal and said exclude signal, for connecting said check signal to a pick signal to select said corresponding entry in the circuit when said group signal and said minor group signal indicates that no selection occurred within any previous pick element circuit group, or any previous minor pick element circuit group, and said exclude signal indicates that said corresponding entry in the circuit is eligible for selection.

* * * * *